United States Patent [19]

Lagerway et al.

[11] Patent Number: 5,774,271
[45] Date of Patent: Jun. 30, 1998

[54] LAMP ASSEMBLY

[75] Inventors: William H. Lagerway, Auburn; Jeffrey Perkins, Tully; Steven R. Slawson, Auburn, all of N.Y.

[73] Assignee: Welch Allyn, Inc., Skaneateles Falls, N.Y.

[21] Appl. No.: 681,894

[22] Filed: Jul. 29, 1996

[51] Int. Cl.$^6$ ............................... G02B 3/00; F21V 7/04
[52] U.S. Cl. .......................... 359/649; 359/799; 362/32; 362/106; 362/268; 362/804; 600/249
[58] Field of Search ..................................... 359/649, 650, 359/799, 800; 362/32, 33, 106, 268, 804, 105; 600/249

[56] References Cited

U.S. PATENT DOCUMENTS

| | | |
|---|---|---|
| 300,868 | 4/1884 | Conforti .................................. D26/39 |
| 608,100 | 7/1898 | Dow . |
| 3,285,242 | 11/1966 | Wallace . |
| 3,645,254 | 2/1972 | Burton .................................. 600/249 |
| 3,830,230 | 8/1974 | Chester .................................. 600/249 |
| 3,951,139 | 4/1976 | Kloots .................................. 600/249 |
| 3,959,612 | 5/1976 | Feinbloom . |
| 4,104,709 | 8/1978 | Kloots .................................. 362/105 |
| 4,234,910 | 11/1980 | Price .................................. 362/105 |
| 4,274,128 | 6/1981 | Malis .................................. 362/105 |
| 4,428,031 | 1/1984 | Mori .................................. 362/32 |
| 4,454,568 | 6/1984 | Stadnik .................................. 362/32 |
| 4,516,190 | 5/1985 | Kloots .................................. 362/32 |
| 4,616,257 | 10/1986 | Kloots et al. .................................. 358/93 |
| 4,757,431 | 7/1988 | Cross et al. .................................. 362/261 |
| 4,916,579 | 4/1990 | Simms .................................. 362/18 |
| 5,268,977 | 12/1993 | Miller .................................. 385/33 |
| 5,430,620 | 7/1995 | Li et al. .................................. 362/32 |

*Primary Examiner*—Hoa Q. Pham
*Attorney, Agent, or Firm*—Wall Marjama & Bilinski

[57] ABSTRACT

A lamp assembly includes a condensing lens group disposed at one end for collecting and collimating a light from a light source, an exit lens group at the other end of the assembly, including at least one objective lens element for projecting an illuminated light spot at a predetermined distance, and an iris disposed between the condenser lens group and the exit lens group having a variable opening for varying the size of the illuminated light spot between a minimum and a maximum spot diameter at the predetermined distance. The invention allows the illuminated light spot to be focused for at least two separate iris positions at the predetermined distance by allowing relative movement between the objective lens element and the iris to provide enhanced edge definition and illumination uniformity.

27 Claims, 9 Drawing Sheets

LAMP ASSEMBLY

BACKGROUND OF THE INVENTION

Surgical-type headlamps or luminaires, such as those described by U.S. Pat. No. 4,516,190, among others, allow a doctor or surgeon to illuminate and thereby visually inspect an area of interest in a convenient manner.

Most lamps are part of a headband which is worn by the doctor and consists of three major optical components contained within a housing—a condenser lens section, an iris, and an exit lens section. The condenser lens section, composed of one or more optical elements, is disposed at one end of the housing through which a fiber optic bundle is fed. The condenser lens section collects the light from the distal end of the fiber optic bundle and collimates the light through the iris, a diaphragm capable of producing variable apertures for controlling the diameter of an illuminated light spot which is projected through the exit lens section disposed at the opposite end of the housing. The exit lens is typically at least one objective element which projects an illuminated light spot onto an area of interest, such as a patient, so as to focus the iris opening at a predetermined distance, typically in the range of about 10–20 inches (25–50 cm).

In headlamp assemblies such as described, the iris opening is externally adjustable, allowing an illuminated light spot of variable diameter to be produced at the predetermined distance so that the doctor can selectively narrow or expand the projected light as required. Typically, an illuminated spot can vary between about 1 to 4 inches (about 25–100 mm).

In placing variable spot diameters at the predetermined distance, however, the headlamp optics are only able to resolve or focus at one specific iris opening position in that the exit lens typically has at least one element which possesses inward field curvature. Therefore, if the iris is at focus at the iris widest opening, it will be out of focus when the iris is closed to a smaller opening (or vice versa). Though an illuminated spot will still be presented to the user the spot will vary greatly in focus and in uniformity, particularly at the edges. The end result is that there are instances in which the uniformity and edge definition of the illuminated light spot will be less defined.

Therefore, there is a need to provide a lamp assembly which is capable at a predetermined distance of producing illuminated light spots of variable diameter, but with consistent edge definition and uniformity.

SUMMARY OF THE INVENTION

A primary object of the present invention is to provide an improved lamp assembly which produces an illuminated spot which can vary in diameter over a range of iris settings but remains sharply resolved with consistent edge definition at a predetermined distance.

Therefore, according to a particular aspect of the present invention, there is provided a lamp assembly comprising:
first optical means at one end of the assembly for collecting and collimating a light from a light source;
second optical means disposed at an opposite end of said assembly for projecting the collimated light as an illuminated light spot at a predetermined distance from said assembly and including at least one objective element;
and an iris disposed between said first and second optical means, having an adjustable opening for varying the size of the illuminated light spot between a minimum and a maximum spot diameter at said predetermined distance, wherein said light spot is focused at said predetermined distance at only a single iris opening, characterized by:
means for focusing the illuminated light spot at said predetermined distance for at least one other iris opening position.

According to another aspect of the present invention, there is provided a lamp assembly comprising a housing;
first optical means for collecting and collimating a light from a light source, said first optical means being disposed at one end of said housing;
second optical means disposed at an opposite end predetermined distance from said assembly, wherein said second optical means includes at least one objective element;
and an iris having an adjustable opening for varying the size of the illuminated light spot between a minimum and maximum spot diameter at said predetermined distance, wherein said illuminated light spot is focused at only one iris opening position, is characterized by:
means for focusing the illuminated light spot at said predetermined distance for at least one other iris opening position.

According to yet another aspect of the present invention, there is provided a surgical headlamp assembly comprising:
a housing including a headband;
and a lamp assembly attached to said housing, said lamp assembly including:
first optical means for collecting and collimating a light from a light source, said first optical means being disposed at one end of said assembly;
second optical means disposed at an opposite end of said assembly for projecting the collimated light as an illuminated light spot at a predetermined distance from said assembly and including at least one objective element;
and an iris disposed between said first and second optical means, said iris having a variable opening for selectively varying the size of the illuminated light spot between a minimum and a maximum spot diameter at said predetermined distance, wherein said light spot is focused at said predetermined distance at only a first iris opening position, is characterized by:
means for focusing the illuminated light spot at said predetermined distance for at least one other iris opening position.

An advantageous aspect of the present invention is that by varying the spacing between the iris and the exit lens, a reliable and consistent illuminated light spot can be projected regardless of the adjustability of the iris opening or the type of field lens in the system.

Another advantageous aspect of the present invention is that a lamp assembly having an iris can be manufactured which allows variability in the size of an illuminated spot without impacting the quality of the projected spot.

Another advantageous aspect is that a lamp assembly made in accordance with the present invention can be made to cheaply produce a consistently uniform illuminated light spot of varying sizes.

Other objects, advantages and features of the present invention will become apparent from the following Description of the Preferred Embodiments as supplemented with the following drawings in which like elements are commonly enumerated.

The figures are not necessarily drawn to scale.

DETAILED DESCRIPTION OF THE INVENTION

Though the following description refers to several embodiments relating to a surgical headlamp assembly, it will be readily apparent that the present invention can be applied to other directed lighting systems.

Figure 1:
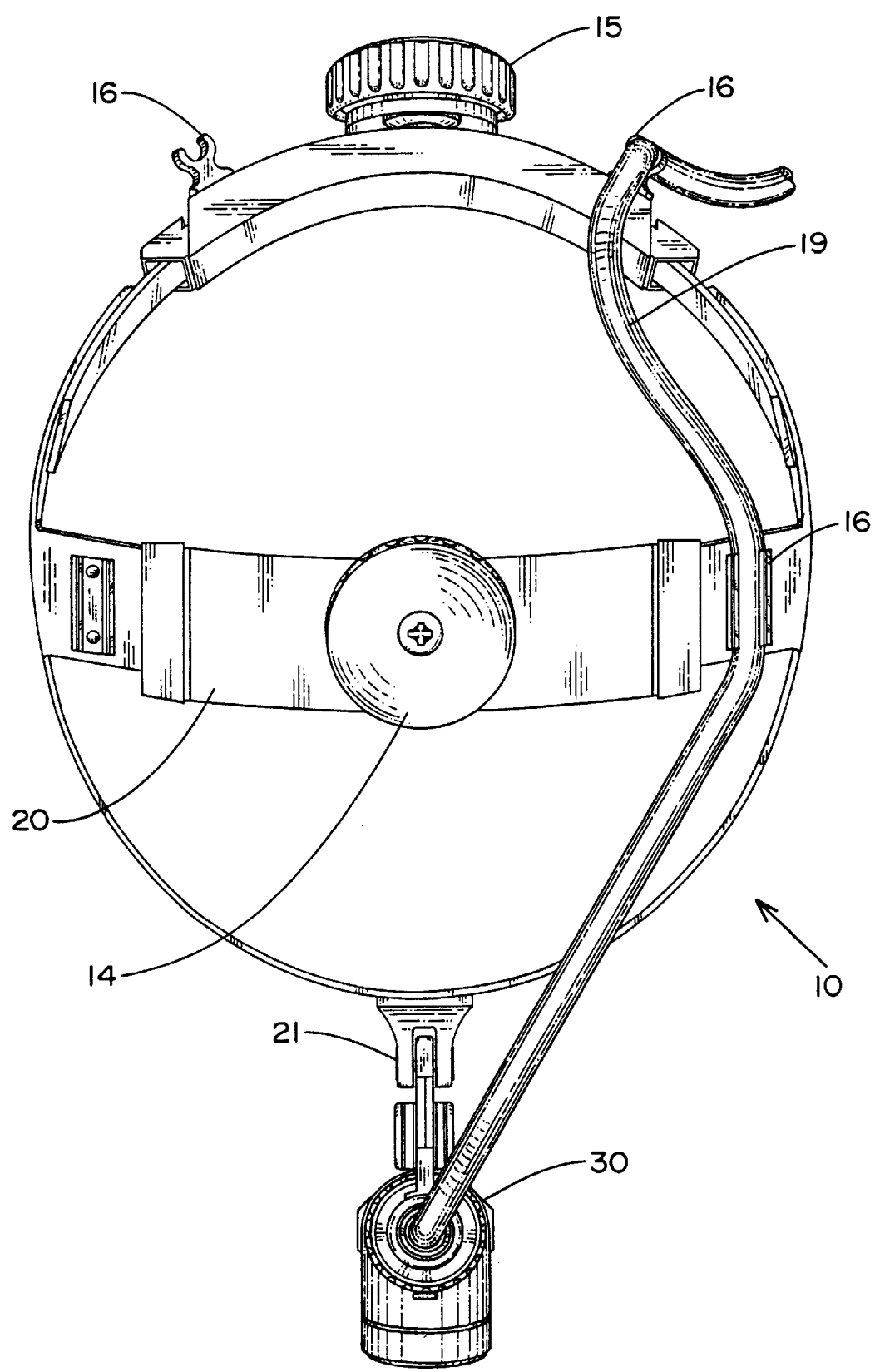
FIG. 1 is a top view of a surgical headlamp having a luminaire used in accordance with the present invention.
Figure 2:
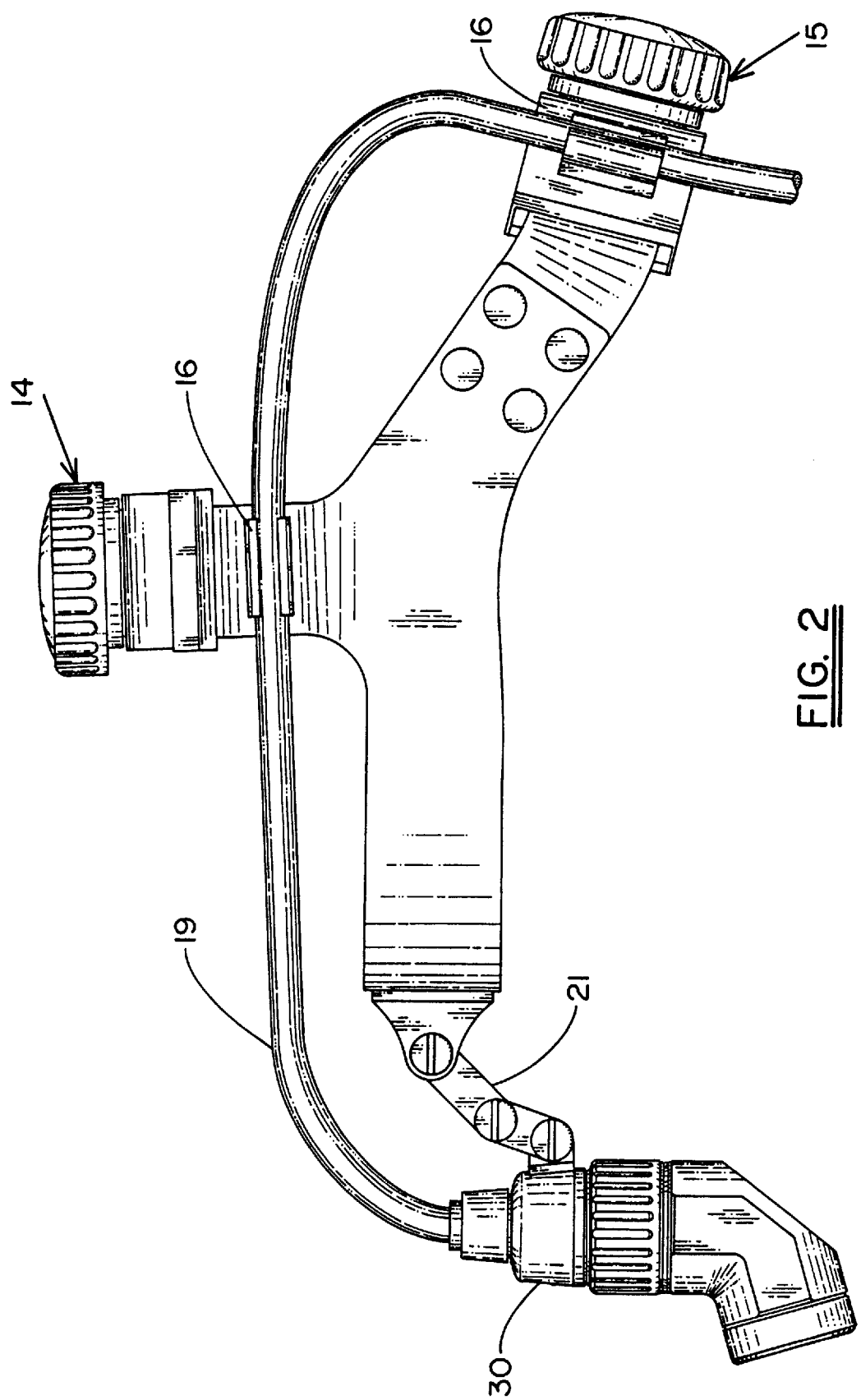
FIG. 2 is a side view of the surgical headband of FIG. 1.

An overall description of the surgical headlamp system 10 provides the basis for FIGS. 1 and 2, including a somewhat circularly shaped headband 20 having a set of adjustable top and rear knobs 14, 15 for allowing the headband to be fitted to the head of an user; e.g. a doctor or surgeon. A pair of fiberoptic cable bundles 19 (shown only in FIG. 2) are guided by clips 16 adjacent the adjustable knobs 14, 15 to the entrance end of a lamp assembly 30 which is mounted via an adjustable linkage 21 to the front of the headband 10 in a known manner, though other suitable means are well known in the prior art for mounting the headlamp assembly 10, such as those described in U.S. Pat. Nos. 4,104,709 and 4,516,190.

Figure 3:
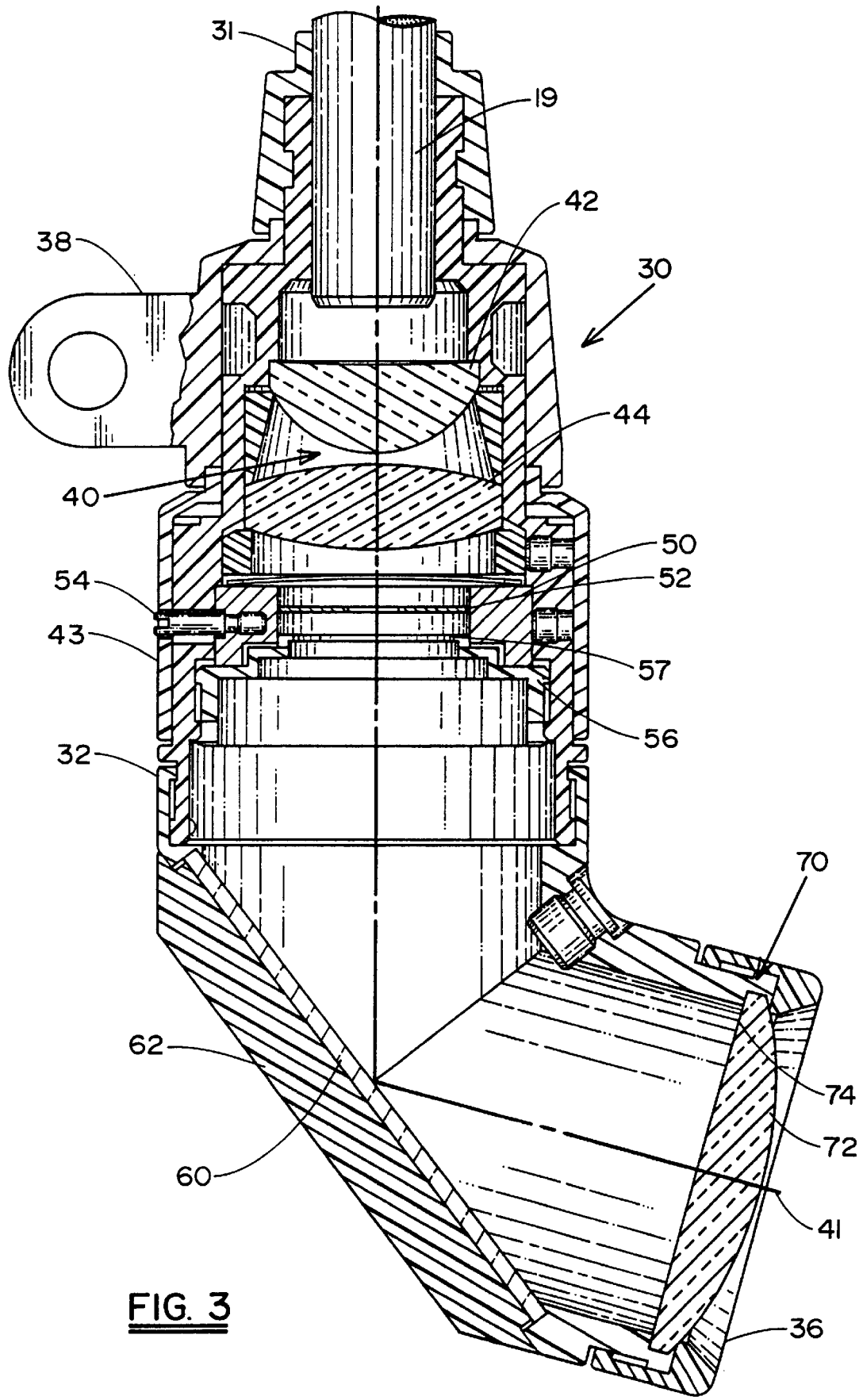
FIG. 3 is a sectional view of the luminaire constructed according to a first embodiment of the present invention.

Each of the succeeding embodiments of the headlamp assembly can be utilized in the surgical headlamp system 10 herein described. Referring to FIG. 3, a sectioned view is provided of the headlamp assembly 30 according to a first embodiment of the present invention comprising a housing 32 defined by a first end 31 through which light from the fiber optic bundles 19 enter and a second end 36 through which the light is projected to a target surface (not shown). The distal end (not shown) of the collected fiber optic bundle 19 illuminates high intensity light from a light source (not shown) which first impinges upon a condenser lens assembly 40, defined in this embodiment by a pair of adjacent optical elements 42, 44 which are mounted within the housing 32 by known means adjacent the distal end of the fiber optic cable bundle 19 which first collects the light from the multiple fiber optic bundle and proceeds to collimate the collected light beam into an essentially parallel array.

An iris assembly 50, having a plurality of leaves or blades 52 which open and close to form a range of openings is disposed in front of the condenser lens group 40 and is aligned with the optical axis 41 of the system. An iris adjustment knob 43 provided on the housing exterior includes an opening (not shown) for rotating an extending pin 54 of the iris diaphragm assembly 50 which when moved angularly causes the iris to open and close. Mounting of the iris assembly 50 within the housing 32 is conventionally known, such as described in U.S. Pat. No. 4,104,709. According to this embodiment, the iris assembly 50 is capable of providing a range of apertures from a minimum opening of about 3 mm to a maximum opening of about 10 mm, though it should be apparent that other similar ranges can be utilized, depending on the application and optical elements used.

A fixed aperture plate 56 is mounted by known means within the housing 32 a small distance forward of the iris assembly 50, the purpose of which will be described below. For purposes of this embodiment, the fixed aperture plate 56 has a single fixed aperture 57 which is preferably slightly less than the maximum adjustable opening of the iris assembly 50; that is, slightly less than 10 mm.

A mirror 60 is mounted to the interior of an angled rear wall 62 of the housing 32 forward of the iris assembly 50 which bends the light directed along the optical axis 41 through the iris opening toward an exit lens assembly 70 which is disposed adjacent the remaining end 36 of the housing 32 for projection onto the target surface (not shown). Preferably, the mirror 60 is coated with a high reflective coating to minimize illumination loss through the system.

The exit lens assembly 70 according to this embodiment includes an objective lens 72, which is fixedly mounted within the remaining end 36 of the housing 32 and projects the light from the fiber optic bundle 19 toward the target surface (not shown).

Figure 8:
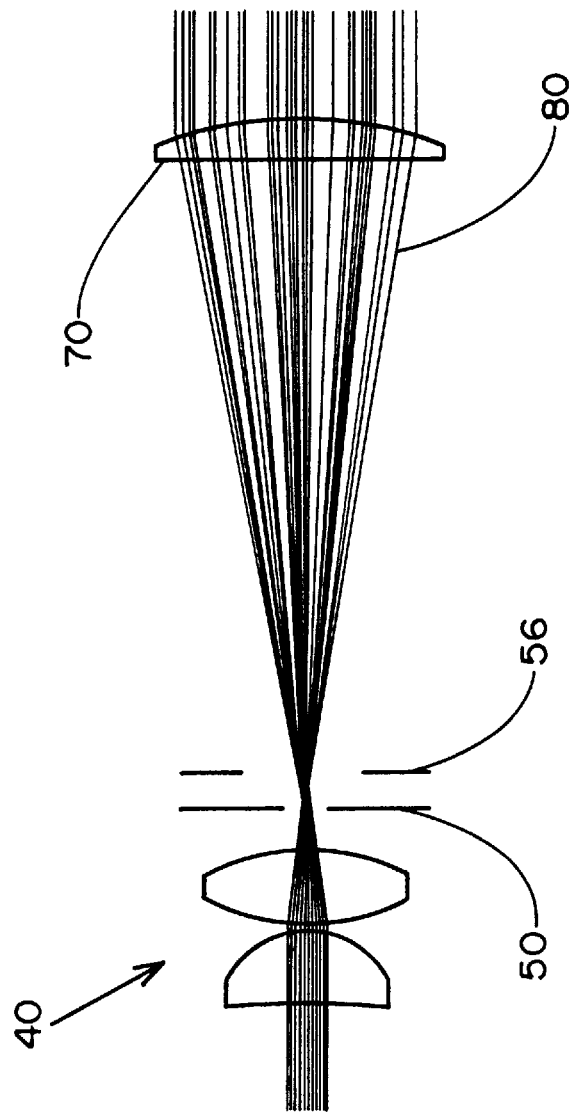
FIG. 8 is a diagrammatical view of an incoming light ray trace of the headlamp shown in FIG. 3, with the iris opened to its minimum opening.

For purposes of this and each of the succeeding lamp assembly embodiments which directly follow, the system is defined by the following parameters (each is approximate):

fiber optic bundle diameter 4 mm
condenser elements focal lengths 13 and 21 mm
objective lens focal length 50 mm
spacing (iris to objective lens) 50 mm
spacing (iris to fixed plate) about 2 mm
spacing (objective lens to target) about 41 cm
magnification power of light spot 7.5
spot diameter range at target about 20–75 mm As is fundamentally known in optics, all positive lenses, such as objective lens 72, have inward field curvature. Because the iris assembly 50 is adjustable through a range of openings, the above system can therefore only be focused for a single iris opening at the predetermined distance. In the present embodiment, the system is focused at the minimum iris opening, as shown diagrammatically in the ray trace shown in FIG. 8, which for ease of discussion only illustrates incoming light from outside the system. Due to the conjugate nature of the optical system, these views are essentially mirrored at the target surface (not shown), as magnified by the objective lens 72.

Figure 9:
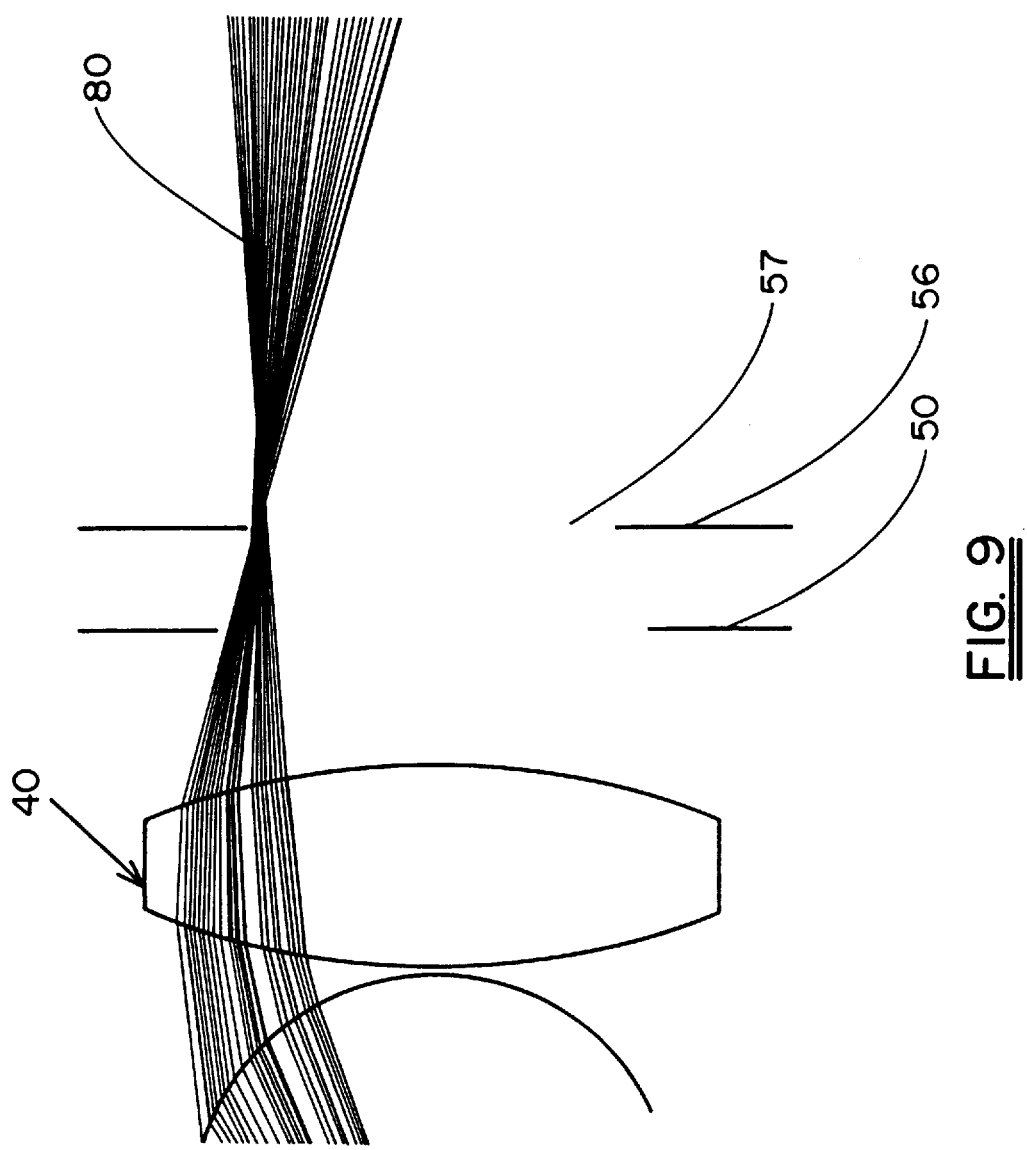
FIG. 9 is a diagrammatical view of an incoming light ray trace of the headlamp of FIGS. 3 and 8, with the iris opened to its maximum aperture.

As the iris opens to the maximum opening according to FIG. 9, the field curvature of the objective lens 72 in combination with the changing iris opening causes a shift in the focus condition as shown at the edge. In the above embodiment, the focus plane at the edge has tangentially shifted approximately 2 mm. As noted, the above changes would be mirrored for an illuminated light spot at the target surface, meaning the iris opening has not been focused at the edges of the illuminated light spot at the predetermined distance from the objective lens 72.

By providing the fixed aperture plate 56 at the shifted edge focal position as shown in FIG. 9, the maximum opening of the iris assembly 50 can be effectively focused at the edges of the spot at the predetermined distance. Preferably, the fixed aperture 57 of the aperture plate 56 is only slightly less than the maximum iris opening. As a result, the two extreme positions of the iris assembly 50 will be properly focused, allowing improved uniformity and edge definition of the illuminated light spot for its largest and smallest projected diameters.

Referring now to FIGS. 4–7, and rather than providing a fixed aperture plate in the optical path of the luminaire such as described in the preceding embodiment to allow a second iris opening to be focused at the illuminated light spot, the entire range of iris openings can more preferably be compensated for, by changing the relative spacing between the iris assembly 50 and the exit lens assembly 70 in accordance with a corresponding change in the iris opening. For purposes of clarity, similar parts used in preceding embodiments will use the same reference numerals.

Figure 4:
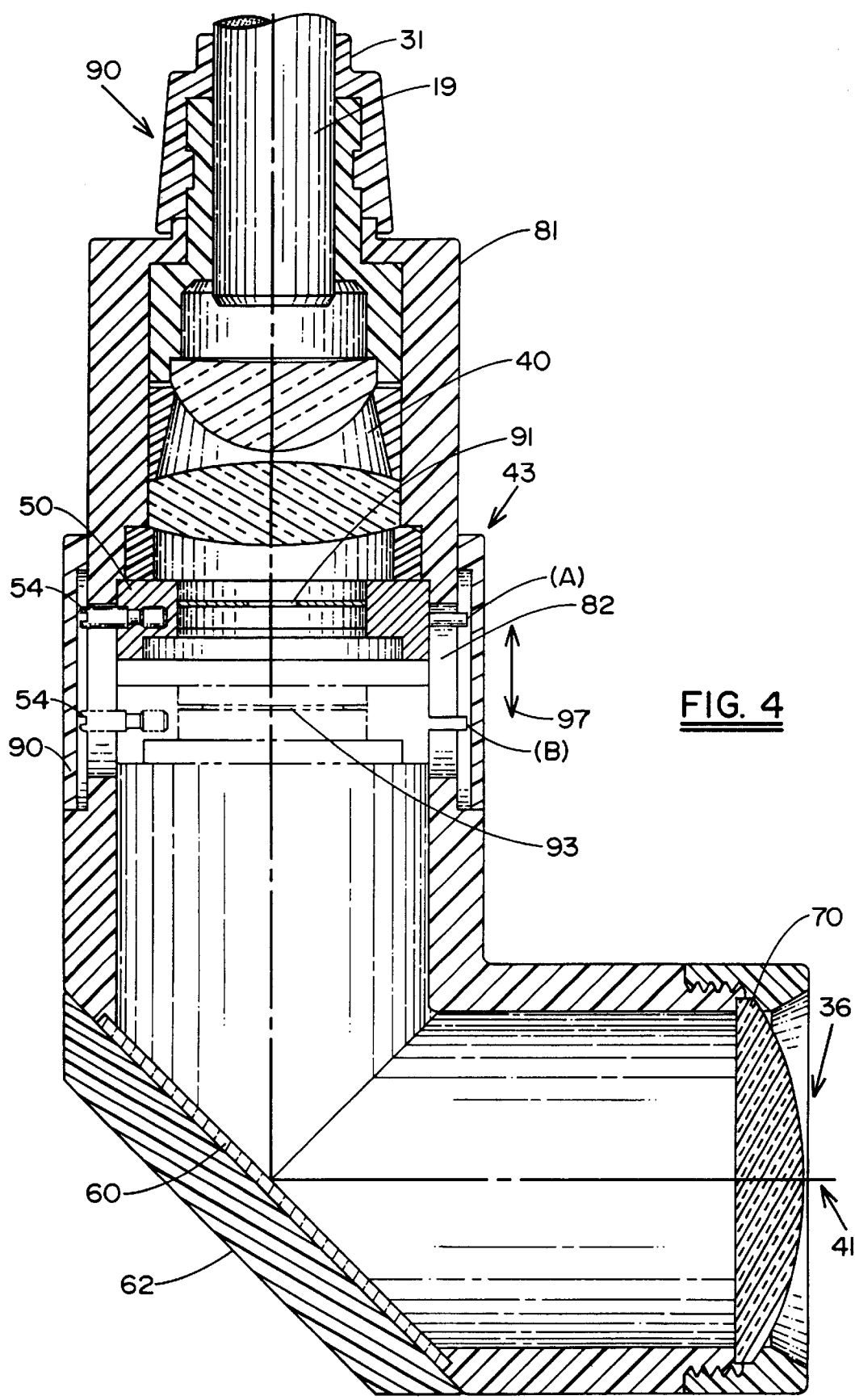
FIG. 4 is a sectional view of a headlamp according to a second embodiment of the present invention.
Figure 5:
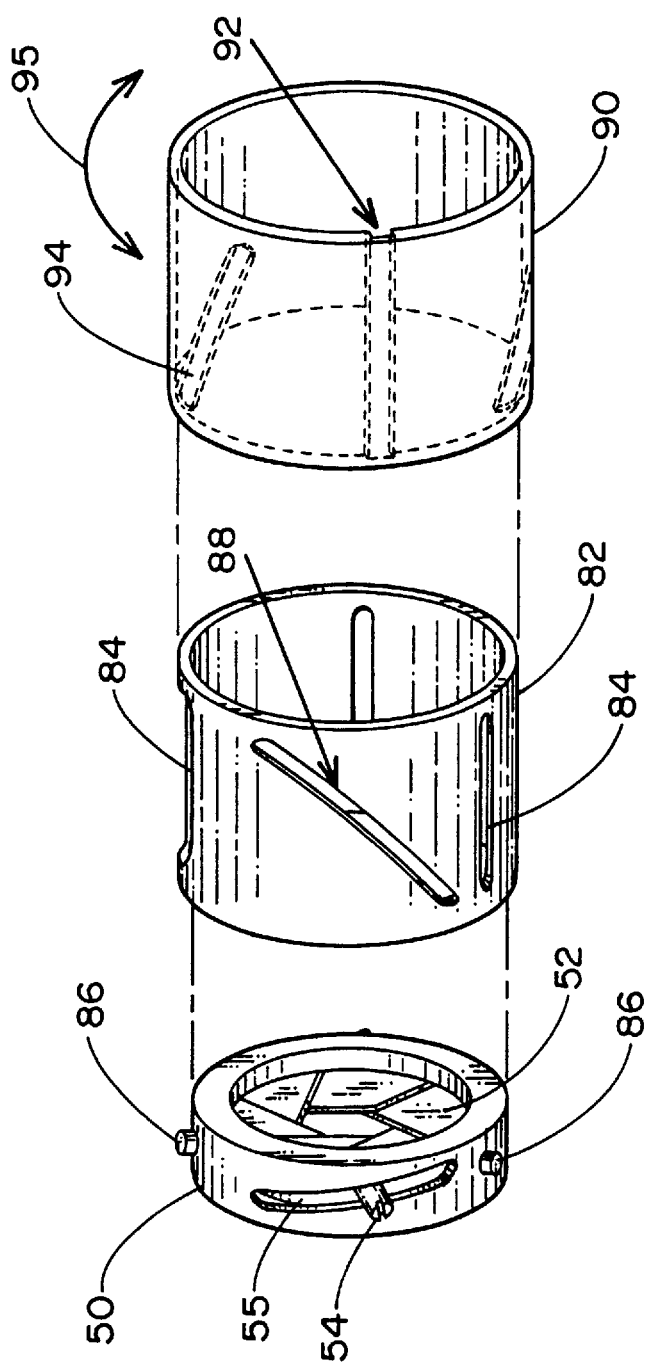
FIG. 5 is a partial exploded perspective view of the iris assembly of the headlamp of FIG. 4.

Referring to FIGS. 4 and 5, a second embodiment of the present invention is illustrated of a lamp assembly 80 having a similar housing 81 as previously described relative to FIG. 3 and having respective first and second ends 31, 36 with three disposed optical portions arranged in the housing in the manner previously described; that is, the condenser lens assembly 40 which is disposed adjacent the first end 31 for collecting and collimating light from an entering fiber optic bundle 19 and an exit lens assembly 70, having an objective lens 72, at the remaining end 36 of the housing for projecting the light along optical axis 41 onto a target as a spot (not shown) at a predetermined distance. For purposes of simplicity, each of the disclosed embodiments produce the illuminated light spot (not shown) at the same predetermined distance of about 41 cm (16 inches) as measured from the end 36 of the housing 32.

As previously described, an iris assembly 50 is disposed within the housing 81 between the exit lens assembly 70 and the condenser lens assembly 40 along with a mirror 60 adhered or otherwise mounted to an interior wall 62 of the housing to direct the collimated light through the remaining end 36 which is angled approximately perpendicular to the first end 31. The iris assembly 50 is a diaphragm having a set of movable blades 52 which open and close in order to define minimum and maximum openings for the entering light collected from the fiber optic bundle 19 passing through the condenser lens group 40. The iris opening is varied by an extending lever or pin 54 which is movable within a circumferential slot 55.

According to this embodiment, however, the iris assembly 50 is made to be axially movable within the housing 32 in accordance with the opening and the closing movement of the iris blades 52. Still referring to FIGS. 4 and 5, the iris assembly 50 is mounted within, an iris retaining portion 82 of the housing 81 (shown only as a section in FIG. 5), which includes a set of longitudinal slots 84 for receiving a corresponding set of spaced studs 86 radially projecting from the exterior of the iris assembly 50, as well as an angled clearance slot 88 sized for receiving the iris extending pin 54.

A rotatable control sleeve 90 having a cylindrical cross section and preferably attached to the interior of the iris adjustment knob 43 is disposed over the iris retaining portion 82 of the housing 81 and includes an interior groove 92 sized to retain the end of the extending iris pin 54 and a set of angled cam slots 94 spaced to receive the studs 86.

In operation as shown in FIG. 4, the iris assembly 50 is initially located in a focused position (A) in which the iris opening 91 is set at the minimum opening. Rotation of the iris adjustment knob 43, per arrow 95, FIG. 5, causes the iris blades 52, FIG. 5, to open as the extending iris pin 54 retained within the iris adjustment knob 43 is angularly moved within the slot 55, FIG. 5, as is commonly known. The rotation of the focusing knob 43, however, also causes the control sleeve 90 to correspondingly rotate, and the iris assembly 50 to translate per arrow 97 toward the exit lens assembly 70 due to the presence of the cam slots 94 in the control sleeve and the clearance slot 88 provided in the iris retaining portion 82 of the housing 81. According to this embodiment, the slots 94, 88 are sized to produce a total iris assembly movement of about 2 mm between position (A) and a second position (B), also shown in FIG. 6, which illustrates the corrected focus position of the iris assembly 50 at the maximum opening of the iris. In this manner, the axial position of the iris assembly 50 is automatically compensated for within the housing 81 of the lamp assembly 80 to maintain focus of the iris opening as the illuminated spot (not shown) varies in diameter at the predetermined distance over the range of possible iris opening settings.

Figure 6:
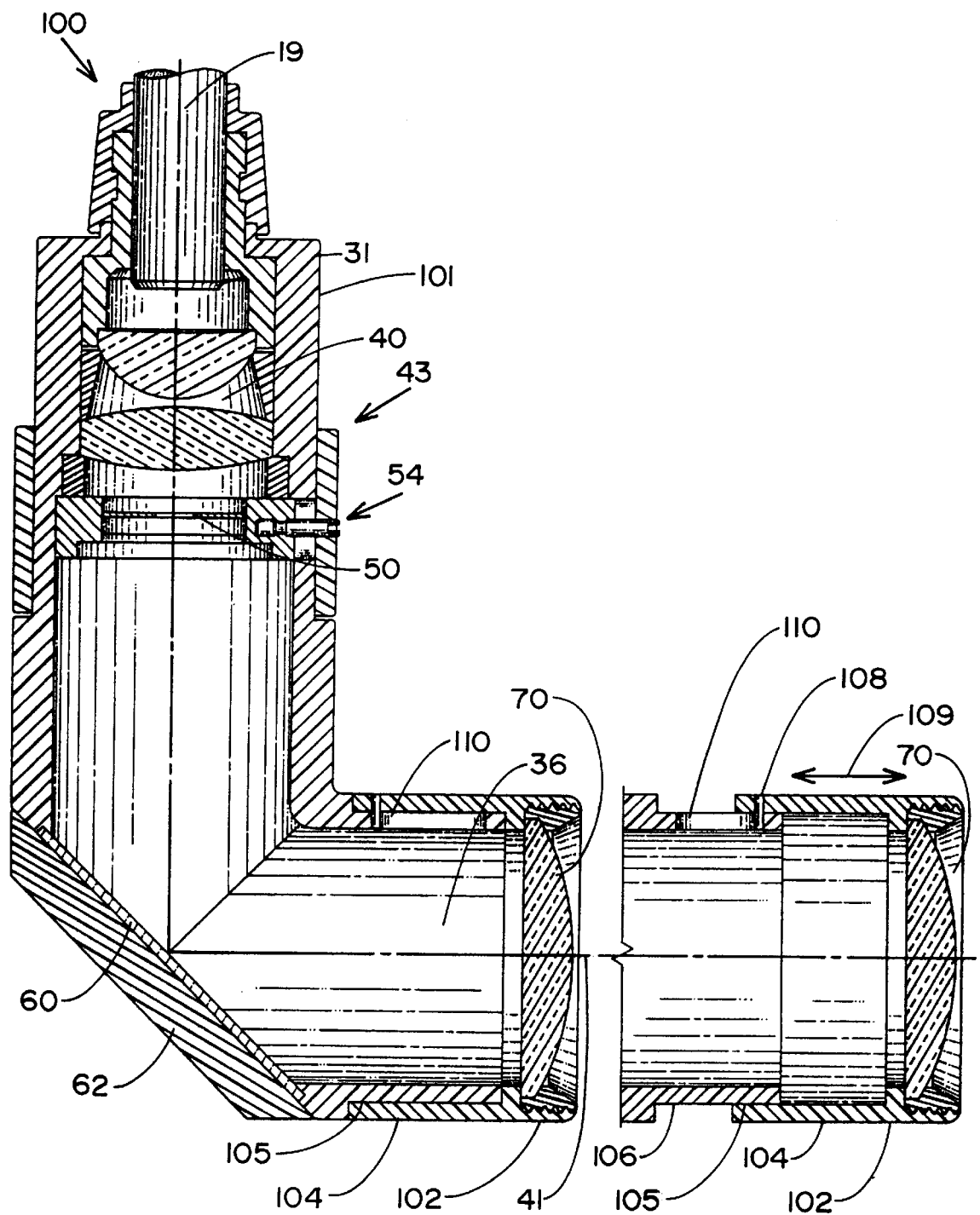
FIG. 6 is a partial perspective view, shown in section of a headlamp made in accordance with a third embodiment of the present invention.

Referring to FIG. 6, a third embodiment of a lamp assembly 100 according to the present invention includes housing 101 which similarly includes a first end 31 for receiving the fiber optic bundle 19 having emitted light which is collected and collimated by the condenser lens section 40 as previously described. Iris assembly 50, disposed slightly forward of the condenser lens section 40, also as previously described, includes a set of blades 52, FIG. 5, movable between a minimum opening and a maximum opening by rotational movement of a iris adjustment knob 43 on the exterior of the housing 101. The knob 43 includes an opening (not shown) for retaining an extending iris pin 54 which is caused to angularly move within a circumferential slot 55, FIG. 5, in a commonly known manner.

In this embodiment, the iris assembly 50 is fixedly mounted within the housing 101, while the exit lens assembly 70 is selectively movable in an axial direction relative to the remaining end 36 of the housing 101. The exit lens 70, made up of objective lens element 72, is fixedly mounted within a retaining member 102 having a defined cavity for retaining the objective lens and a depending circumferential sleeve portion 104 which is fitted over a stepped portion 110 of the housing end 36 and includes an inner bearing surface 105 which engages a similar radial outer bearing surface 106 of the stepped portion 110 to allow sliding axial movement of the retaining portion in the axial direction along optical axis 41, shown as 109. A pin 108 is engageable with the stepped portion 110 to lock the retaining portion 102 in a selected axial position.

In operation, as the iris opening is opened or closed by means of the iris adjustment knob 43, the user can select to independently shift the location of the exit lens assembly 70 by movement of the retaining member 102 in a linear direction. According to this embodiment, an opening of the iris should be accompanied by an axial movement toward the target surface (not shown), as insetly shown in FIG. 6.

It should be apparent to one of ordinary skill that there are a myriad of other techniques which can be employed to move the exit lens group 70 relative to the end of the housing 101, e.g. making the sleeve portion threaded, use of cam slots, etc in order to change the spacing between the iris assembly and the exit lens to compensate for focusing the changing iris opening at the illuminated light spot at the predetermined distance.

Figure 7:
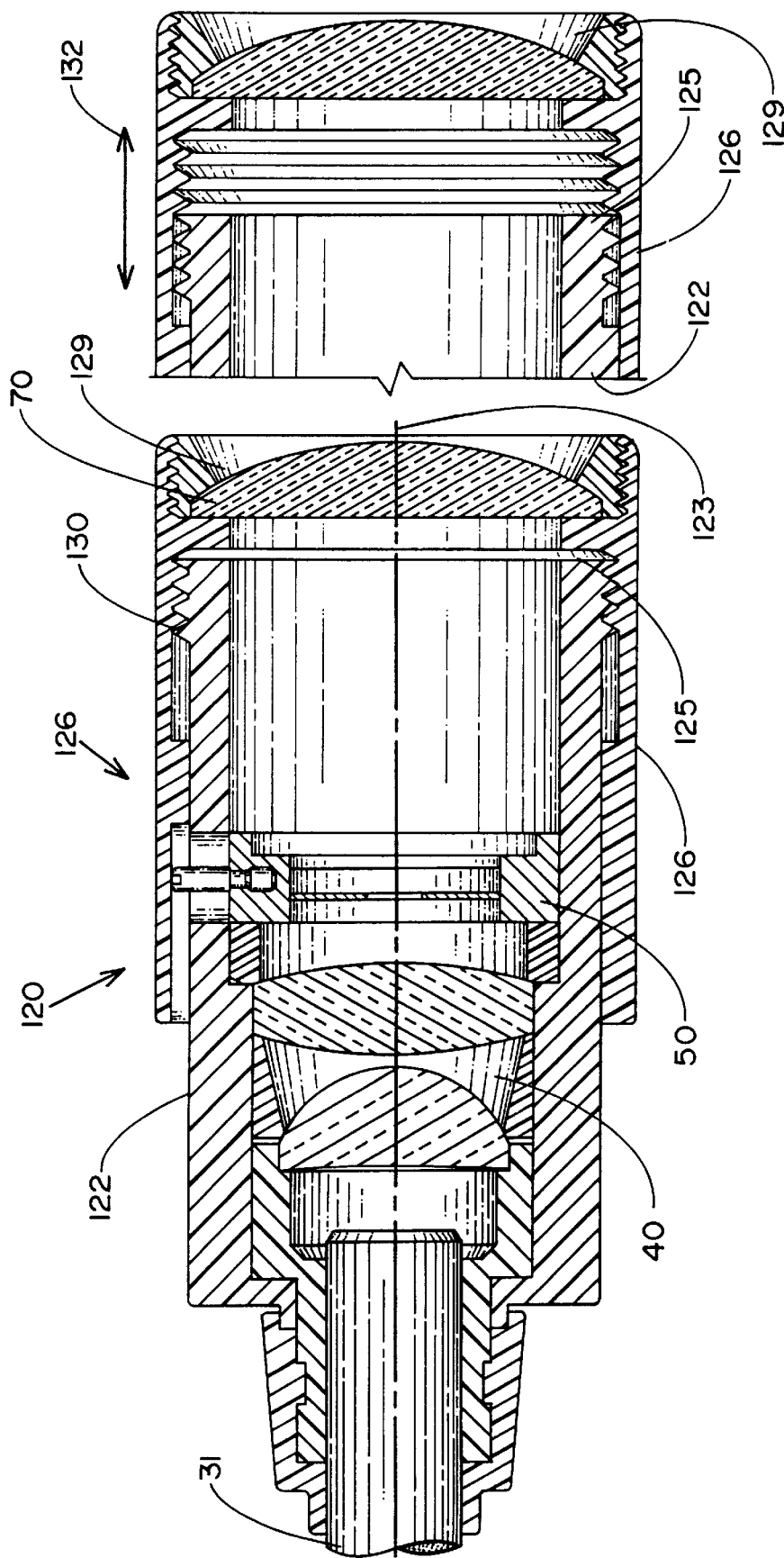
FIG. 7 is a partial perspective view, shown in section of a headlamp made in accordance with a fourth embodiment of the present invention.

Referring to FIG. 7, a lamp assembly 120 according to a fourth embodiment of the present invention is shown having similar optical elements; that is, the condenser lens assembly 40, iris assembly 50, and exit lens assembly 70 which are linearly arranged relative to a cylindrical housing 122. According to this embodiment, the lamp assembly 120 has a substantially horizontal optical axis 123 (according to the conventions shown) along which entering light from the fiberoptic bundle 19 is collected and collimated by the condenser lens assembly 40 and directed through the iris assembly 50 and exit lens assembly 70 to be projected onto a target surface (not shown) at a predetermined distance.

A tubular control sleeve 126 having a substantially cylindrical cross section is sized to fit over a portion of the exterior of the cylindrical housing 122; specifically from the iris assembly 50 to the front end 125 of the housing so as to extend therefrom. The control sleeve 126 includes an inner threaded portion 128 for engaging a corresponding set of threads 130 on the housing end 125 having a cavity 129 for retaining the objective lens 72, which is fixedly mounted therein by known means.

The control sleeve 126 is connected via a groove (not shown) to the iris pin 54, FIG. 5, at the remaining end of the sleeve.

In operation, and by rotating the control sleeve 126, the iris assembly 50 is opened and closed in the manner previously described by angular movement of the extending pin 54 retained by the control sleeve 126 to cause the blades to open and close between a minimum and maximum opening. As the iris blades 52, FIG. 5, are opened from the minimum opening (not shown), the control sleeve 126 correspondingly rotates, along with the threaded end portion 128 causing the control sleeve to translate axially in coordination with the opening of the iris assembly, thereby moving the objective lens 72, relative to the fixedly mounted iris assembly 50. FIG. 6 illustrates the maximum iris opening position in which the objective lens 70 is extended forward of the housing end 125 by approximately 2 mm, according to this embodiment to accurately focus the iris opening at the illuminated light spot (not shown). The inset illustrates the position of the objective lens 72 at the minimum iris opening by axial movement per arrow 132 which is coincident with optical axis 123.

As noted, the variation in spacing between the iris assembly 50 and the exit lens assembly 70 correlates with the focusing of the adjusted iris opening, therefore edge uniformity of the illuminated light spot is maintained throughout the range of available iris openings; that is, between the minimum and maximum spot diameters, at the same predetermined distance.

As noted above, it should be readily apparent that other embodiments can be imagined in which either the iris and/or the exit lens assembly can be moved in conjunction with the varying iris aperture to produce a focused spot at the predetermined distance.

The invention has been described in a limited number of embodiments, but it will be understood that variations and modifications can be effected to those of skill in the art. Therefore, the claims should be interpreted to fairly cover all such modifications and applications within the true spirit and scope of the invention; for example, the number of optical elements in the condenser lens group can easily vary depending on the size of the fiber optic bundle and the amount of illumination desired, among other factors.

What is claimed is:

1. A lamp assembly comprising:

first optical means for collecting and collimating a light from a light source, said first optical means being disposed at one end of said assembly;

second optical means disposed at an opposite end of said assembly for projecting the collimated light as an illuminated light spot at a predetermined distance from said assembly and including at least one objective element;

and an iris disposed between said first and second optical means, said iris having an adjustable opening for selectively varying the size of the illuminated light spot between a minimum and a maximum spot diameter at said predetermined distance, wherein said light spot is focused at said predetermined distance at only a first iris opening position, is characterized by:

means for focusing the illuminated light spot at said predetermined distance for at least one other iris opening position.

2. A lamp assembly according to claim 1, wherein said focusing means includes means for varying the spacing between said iris and said second optical means based on the iris opening selected.

3. A lamp assembly according to claim 1, wherein said focusing means includes means for axially moving the iris relative to the exit lens as the iris opening is selectively changed, said moving means being coordinated to move said iris to an axial position which maintains the focus of said iris at the predetermined distance.

4. A lamp assembly according to claim 3, wherein said moving means is selectively engageable to axially move said iris when the iris opening is changed.

5. A lamp assembly according to claim 1, wherein said focusing means includes means for moving said exit lens relative to said iris as the iris opening is selectively changed, said moving means being coordinated to move said exit lens to a position which maintains the focus of said iris at the predetermined distance.

6. A lamp assembly according to claim 5, wherein said moving means is selectively engageable to axially move said exit lens depending on the iris opening selected.

7. A lamp assembly according to claim 1, wherein said focusing means includes a fixed aperture plate having an aperture which is substantially equal to a second separate iris opening, said plate being disposed in a location in said assembly which allows the second iris opening to be focused on the illuminated light spot at the predetermined distance.

8. A lamp assembly according to claim 7, wherein said light spot is focused for one of said minimum and maximum iris openings, and said fixed aperture plate is disposed in said assembly to focus the other of said minimum and maximum iris openings on the illuminated light spot at the redetermined distance.

9. A lamp assembly according to claim 1, wherein said light spot is focused for one of said minimum and maximum iris openings, and said focusing means focuses the other of said minimum and maximum iris openings on the illuminated light spot at the predetermined distance.

10. A lamp assembly comprising:

a housing;

first optical means for collecting and collimating a light from a light source, said first optical means being disposed at one end of said housing;

second optical means disposed at an opposite end predetermined distance from said assembly, wherein said second optical means includes at least one objective element;

and an iris having an adjustable opening for varying the size of the illuminated light spot between a minimum and maximum spot diameter at said predetermined distance, wherein said illuminated light spot is focused at only one iris opening position, is characterized by:
    means for focusing the illuminated light spot at said predetermined distance for at least one other iris opening position.

11. A lamp assembly according to claim 10, wherein said focusing means includes means for varying the spacing between said iris and said second optical means based on the iris opening selected.

12. A lamp assembly according to claim 10, wherein said focusing means includes means for axially moving the iris relative to the exit lens as the iris opening is selectively changed, said moving means being coordinated to move said iris to an axial position which maintains the focus of said iris at the predetermined distance.

13. A lamp assembly according to claim 12, wherein said moving means is selectively engageable to axially move said iris when the iris opening is changed.

14. A lamp assembly according to claim 10, wherein said focusing means includes means for moving said exit lens relative to said iris as the iris opening is selectively changed, said moving means being coordinated to move said exit lens to a position which maintains the focus of said iris at the predetermined distance.

15. A lamp assembly according to claim 14, wherein said moving means is selectively engageable to axially move said exit lens depending on the iris opening selected.

16. A lamp assembly according to claim 10, wherein said focusing means includes a fixed aperture plate having an aperture which is substantially equal to a second separate iris opening, said plate being disposed in a location in said assembly which allows the second iris opening to be focused on the illuminated light spot at the predetermined distance.

17. A lamp assembly according to claim 16, wherein said light spot is focused for one of said minimum and maximum iris openings, and said fixed aperture plate is disposed in said assembly to focus the other of said minimum and maximum iris openings on the illuminated light spot at the predetermined distance.

18. A lamp assembly according to claim 10, wherein said light spot is focused for one of said minimum and maximum iris openings, and said focusing means focuses the other of said minimum and maximum iris openings on the illuminated light spot at the predetermined distance.

19. A surgical headlamp assembly comprising a housing including a headband, and a lamp assembly attached to said housing, said lamp assembly including:
    first optical means for collecting and collimating a light from a light source, said first optical means being disposed at one end of said assembly;
    second optical means disposed at an opposite end of said assembly for projecting the collimated light as an illuminated light spot at a predetermined distance from said assembly and including at least one objective element;
    and an iris disposed between said first and second optical means, said iris having an adjustable opening for selectively varying the size of the illuminated light spot between a minimum and a maximum spot diameter at said predetermined distance, wherein said light spot is focused at said predetermined distance at only a first iris opening position, is characterized by:
        means for focusing the illuminated light spot at said predetermined distance for at least one other iris opening position.

20. A surgical headlamp assembly according to claim 19, wherein said focusing means includes means for varying the spacing between said iris and said second optical means based on the iris opening selected.

21. A surgical headlamp assembly according to claim 19, wherein said focusing means includes means for axially moving the iris relative to the exit lens as the iris opening is selectively changed, said moving means being coordinated to move said iris to an axial position which maintains the focus of said iris at the predetermined distance.

22. A surgical headlamp assembly according to claim 21, wherein said moving means is selectively engageable to axially move said iris when the iris opening is changed.

23. A surgical headlamp assembly according to claim 19, wherein said focusing means includes means for moving said exit lens relative to said iris as the iris opening is selectively changed, said moving means being coordinated to move said exit lens to a position which maintains the focus of said iris at the predetermined distance.

24. A surgical headlamp assembly according to claim 23, wherein said moving means is selectively engageable to axially move said exit lens depending on the iris opening selected.

25. A surgical headlamp assembly according to claim 19, wherein said focusing means includes a fixed aperture plate having an aperture which is substantially equal to a second separate iris opening, said plate being disposed in a location in said assembly which allows the second iris opening to be focused on the illuminated light spot at the predetermined distance.

26. A surgical headlamp assembly according to claim 25, wherein said light spot is focused for one of said minimum and maximum iris openings, and said fixed aperture plate is disposed in said assembly to focus the other of said minimum and maximum iris openings on the illuminated light spot at the predetermined distance.

27. A surgical headlamp assembly according to claim 19, wherein said light spot is focused for one of said minimum and maximum iris openings, and said focusing means focuses the other of said minimum and maximum iris openings on the illuminated light spot at the predetermined distance.

\* \* \* \* \*